United States Patent [19]

Williams

[11] Patent Number: 4,688,478

[45] Date of Patent: Aug. 25, 1987

[54] ADAPTER SUPPORT, PUREER/STRAINER AND JUICER ATTACHMENTS FOR USE ON FOOD PROCESSOR BOWLS

[75] Inventor: James E. Williams, Stamford, Conn.

[73] Assignee: Cuisinarts, Inc., Greenwich, Conn.

[21] Appl. No.: 846,253

[22] Filed: Mar. 31, 1986

[51] Int. Cl.$^4$ .............................................. A23N 1/00
[52] U.S. Cl. ....................................... 99/503; 99/512; 99/513; 241/92; 241/282.1
[58] Field of Search ......................... 99/495, 501–505, 99/509–511, 512, 513; 366/314; 241/92, 282.1

[56] References Cited

U.S. PATENT DOCUMENTS

| | | | |
|---|---|---|---|
| 4,240,338 | 12/1980 | McClean | 99/503 |
| 4,378,730 | 4/1983 | Coggiola | 99/501 |
| 4,516,733 | 5/1985 | Funagura et al. | 241/92 X |

*Primary Examiner*—Timothy F. Simone
*Attorney, Agent, or Firm*—Parmelee, Bollinger & Bramblett

[57] ABSTRACT

A bowl extender-actuator-and-adapter support has larger upper and smaller lower annular channel members separated by an intermediate shelf and is adapted to be mounted on the bowl of a food processor wth the lower channel member extending down into the bowl and is terminated at its lower end in a spider support web having a central opening in alignment with the rotary drive of the food processor extending up into the bowl. A plurality of radially spaced support ribs below the intermediate shelf define a plurality of mounting steps for enabling this adapter support to be mounted upon food processor bowls of various sizes. An actuator on the shelf extends downwardly outside of the bowl for activating the interlock switch of the food processor. A speed-reduction torque-increasing transmission gear drive unit positioned in the central opening of the spider is coupled to the rotary drive of the food processor and has an upwardly extending shaft for driving attachments positioned thereon at reduced speed with increased torque. A juicer attachment includes a rotating basket integral with a centrally located juicer reamer which is adapted to receive larger sized reamers in telescoped relationship locked for rotation on a splined base. A pureer/strainer attachment is mountable on the shaft of the transmission unit and includes a bridge support for positioning a pair of rearwardly inclined wiper blades extending down into the strainer for pushing food items through the strainer.

17 Claims, 13 Drawing Figures

ADAPTER SUPPORT, PUREER/STRAINER AND JUICER ATTACHMENTS FOR USE ON FOOD PROCESSOR BOWLS

BACKGROUND

This invention relates to food processor apparatus, and more particularly, to a bowl extender actuator and adapter support as well as to pureer/strainer and juicer attachments which may be used therewith, permitting such attachments to be used on different sizes of existing food processor bowls without changing their structures.

Food processors are versatile, multi-function machines which may be utilized for performing a variety of cutting, slicing, rasping, chopping, kneading and many other food processing functions. However, not all of these food processors are equipped or adapted to perform certain desirable food-processing functions, such as pureeing, straining and juicing. Since various models of food processors are available with differently sized bowls, there are difficulties in adding attachments such as a purrer/strainer or a juicer, because different sizes of attachments are needed to fit or operate with the different sizes of bowls.

It is desirable to provide additional attachments which will extend the versatility of food processors, and it is also highly desirable to adapt such new attachments for use on existing models of food processors. Thus, the customer can buy an attachment, instead of needing to buy a redesigned food processor or a whole separate electrical appliance to perform the functions provided by the attachment.

SUMMARY

Accordingly, it is an object of this invention to provide adapter apparatus which enables new food processing attachments to be used on bowls of various sizes.

It is among the advantages of this invention to extend and expand the range of food-processing functions which can be achieved by existing models of food processors, and more particularly to enable pureeing/straining and juicing operations to be performed rapidly and efficiently on existing food processors at much slower rotational speed and with much more driving torque than is available in existing models of food processors.

Another object of this invention is to provide a new pureer/strainer attachment which may be utilized with existing models of food processors having bowls of various sizes.

A further object of this invention is to provide food processor apparatus having a new and improved juicer attachment suitable for processing various sizes of citrus fruits into juice.

Still another object of this invention is to provide a bowl extender-actuator-and-adapter support for a food processor which will fit various sizes of food processor bowls and will support and operate various attachments therein driven by the motor drive of a food processor.

Among the advantages of this bowl extender-actuator-and-adapter support are those resulting from the fact that a speed-reduction, torque-increasing geared transmission unit is capable of being housed and supported therein together with attachments driven by the power output shaft of this transmission unit for increasing the versatility of new and existing models of food processors.

Among the further advantages of this invention are the provisions of an adapter support for use with food processors which may be easily and conveniently attached to and disengaged from the motor drive of a food processor and which is convenient and easy to mount in operating position on food processor bowls ready for use.

In carrying out this invention in illustrative embodiments thereof, a pureer/strainer attachment and a juicer attachment are provided for a food processor having a motor drive with switch actuating means for energizing the motor drive and having a working bowl with a rotary drive extending up into the bowl driven by the motor drive and adapted to rotate various tools in the bowl coupled to this rotary drive. A bowl extender actuator and adapter support, having a larger upper annular channel member and a smaller lower annular channel member separated by an intermediate shelf, is adapted to be mounted on the bowl of a food processor with the lower channel member extending down into the bowl. The lower end of this lower annular channel member is terminated in a spider having a socket and a central opening therethrough which is located in alignment with the rotating tool drive of the food processor when the intermediate shelf is positioned on the rim of the bowl. An actuator is mounted on this shelf, and this actuator extends outside of the bowl and is capable of activating the switch actuating means when the adapter support has been properly mounted on the bowl to bring the actuator into operating relationship with the switch actuating means. A speed-reduction torque-increasing geared transmission unit is coupled to the rotary drive of the food processor. This transmission unit is positioned and held in the central opening and socket of the spider. The transmission unit has a power output shaft extending upwardly therefrom on which a food processor attachment is mounted for driving the attachment in the adapter support at a markedly reduced rotational speed and with markedly increased available torque. The shelf on the adapter support includes a plurality of radially spaced support ribs extending downwardly therefrom defining a sequence of radially spaced mounting steps adapted to seat down onto the rims of bowls of various sizes.

Among the attachments which can be put into the bowl extender adapter support to be mounted on the geared transmission unit are a novel pureer/strainer with stationary wiper blades cooperating with a rotating annular strainer basket. These wiper blades are adjustable upwardly and downwardly in position by their support bridge for adjusting the clearance between the blades and the revolving strainer basket.

Another attachment which can be put into the bowl extender adapter support is a juicer attachment featuring a rotating basket with a juice reamer integrally included with the basket. This juice reamer is located in the center of the basket and is adapted to have a series of juice reamers of progressively larger size positioned thereon for extracting juice from various types of citrus fruits of different sizes.

Advantageously, the pureer/strainer includes an annular hopper strainer which is revolved by the power output shaft of the transmission unit. Consequently, this hopper strainer is revolved at a speed of about 250 RPM in the illustrative embodiment, namely at about 4 revolutions per second, whereas the tool drive shaft of a food processor turns at a much faster rate of about 1740 RPM, namely about 29 revolutions per second. The transmission unit is mounted in the socket of the stationary spider located at the lower end of the bowl-extender-adapter support. The stationary spokes of this spider serve as scrapers for scraping off from the bottom surface of the revolving hopper strainer the strained and pureed foodstuffs which have passed through the pores of the revolving strainer. A pair of stationary inclined wiper blades push food items down through the pores of the revolving hopper strainer. The spacing between these stationary wiper blades and the revolving strainer is adjusted by the bridge which holds these wiper blades in place.

The juicer attachment includes an annular basket integral with a centrally located fluted juice reamer. This integral basket and juice reamer is revolved by the power output shaft of the transmission unit at a speed of about 250 RPM in the illustrative embodiment, which is much less rapid than the normal speed of about 1740 RPM, which is the usual rate of speed of the tool drive shaft in a food processor.

BRIEF DESCRIPTION OF THE DRAWINGS

The invention, together with further objects, features, advantages and aspects thereof, will become more fully understood from a consideration of the following description taken in conjunction with the accompanying drawings in which like elements are designated with the same reference numerals throughout the various views.

FIG. 5 (and also FIG. 6) shows this bowl-extender adapter support enlarged moderately from its size as seen in FIGS. 1 and 2 and reduced moderately from its size as seen in FIGS. 3 and 4.

FIG. 7 is drawn on the same scale as FIGS. 3 and 4. The partial section in FIG. 7 is taken along the line 7—7 in FIG. 9.

DESCRIPTION OF THE PREFERRED EMBODIMENTS

Food processors 25 (FIG. 1) of the type to which the present invention is directed include a working bowl 24 having a handle 27 and with a motor driven tool mounting shaft 34 projecting vertically upward through a well 37 in the bottom of the bowl on which various selected rotary tools can be engaged to be driven by the shaft 34 for performing various food processing operations in the bowl 24 in accordance with the desires of the user. The bowl 24 is removably mounted on top of a base housing 33 containing the motor drive 35 and carries a push rod or actuator 30 for actuating an interlock switch 32. When this interlock switch 32 is turned on, it enables the motor drive 35 to be operated by manual controls (not shown) on the base 33 for performing food processing operations, and when this interlock switch is turned off, it disables the motor drive 35 for preventing the motor drive from turning the tool mounting shaft 34. Operation of the switch actuator rod 30 is generally caused by a cam, attached to a bowl cover (not shown) which is placed on top of the bowl 24 in a twist lock manner, engaging the switch actuator 30 to enable the motor drive to be used. Further information with respect to this general type of food processor 25 can be found in U.S. Pat. No. 3,892,365—Pierre Verdun.

This type of food processor 25 as briefly described above is manufactured in different models with bowls 24 of different sizes, each of which contains an actuator rod 30 which must be depressed in order to enable operation of the motor drive of the food processor. The attachments of the present invention employ a bowl extender actuator and adapter support unit to be described later which can be mounted on bowls 24 of various sizes and will perform an actuator function when properly mounted on the bowl to actuate the interlock switch 32 for enabling the motor drive 35 of the food processor to be operated. This bowl extender actuator and adapter support houses and holds in position a speed-reduction, torque-increasing geared transmission unit having a power output shaft for rotating at an advantageous speed pureer/strainer and juicer attachments for the food processor.

Bowl Extender Actuator and Adapter Support Unit

Figure 5:
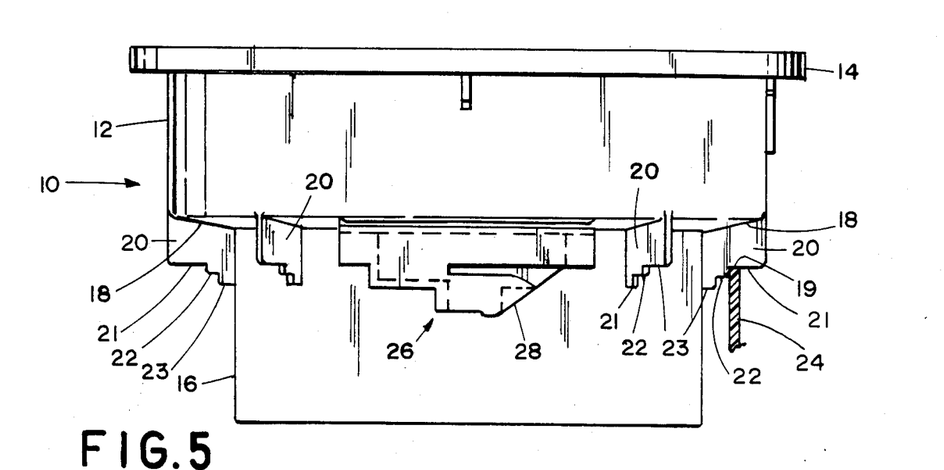
FIG. 5 is a side elevational view of a bowl-extender actuator-and-adapter support unit intended to be positioned on a bowl of a food processor. This adapter support serves to adapt various sizes of bowls to use attachments such as illustrated in FIGS. 1-4.
Figure 6:
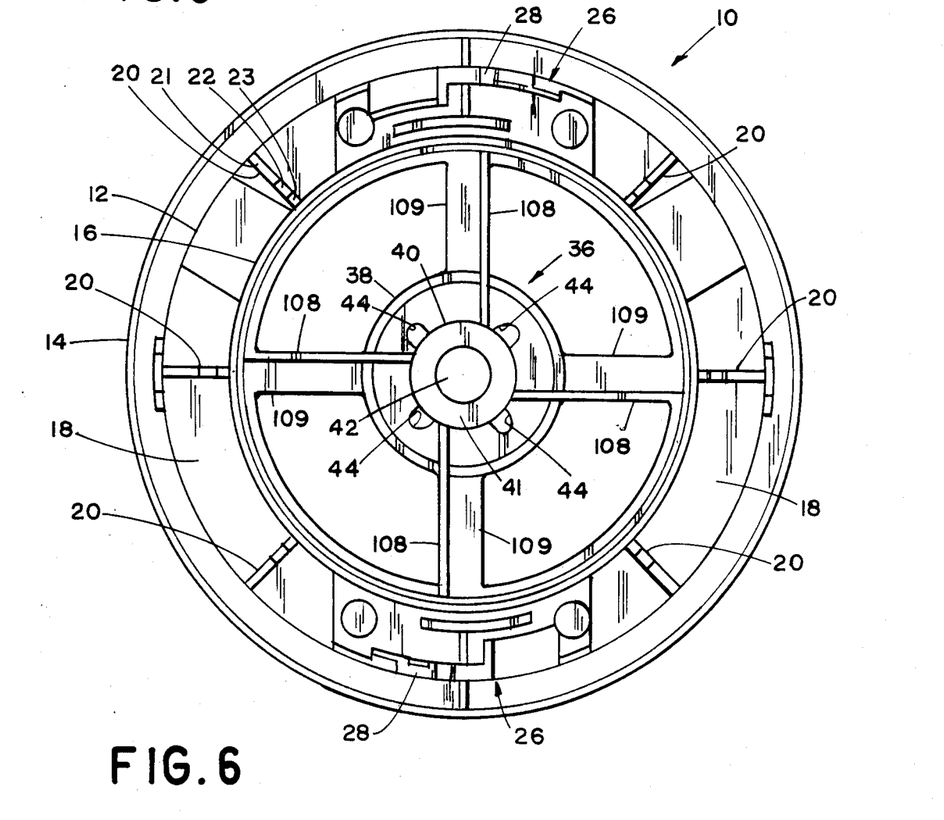
FIG. 6 is a bottom view of the bowl extender actuator and adapter support unit shown in FIG. 5.

Referring now to FIGS. 5 and 6, a bowl extender actuator and adapter support unit, referred to generally by the reference numeral 10, has an annular upper channel member 12 terminated at the top by an annular rim 14 and has a smaller, lower annular channel member 16 which is jointed to the upper channel member 12 by an intermediate shelf or chine 18. A plurality, for example six, of circumferentially spaced radial support ribs 20 each having mounting steps 21, 22 and 23 thereon are secured between the underside of said shelf 18 and the outer surface of the lower annular channel member 16. The mounting steps 21, 22, 23 of the ribs 20 are adapted to position the adapter support 10 on the rim 19 of a working bowl 24 (FIG. 1) of a food processor, generally indicated at 25. The lower annular channel member 16 extends downwardly inside of the bowl 24 when the stepped ribs 20 are seated on the rim of the bowl 24. The steps 21, 22 and 23 will accommodate differently sized bowls, with the innermost lowest step 23 fitting on the smallest bowl while the outermost uppermost step 21 will accommodate at least two different larger sizes of bowls. The intermediate step 22 at an intermediate level will accommodate a bowl of intermediate size.

Figure 1:
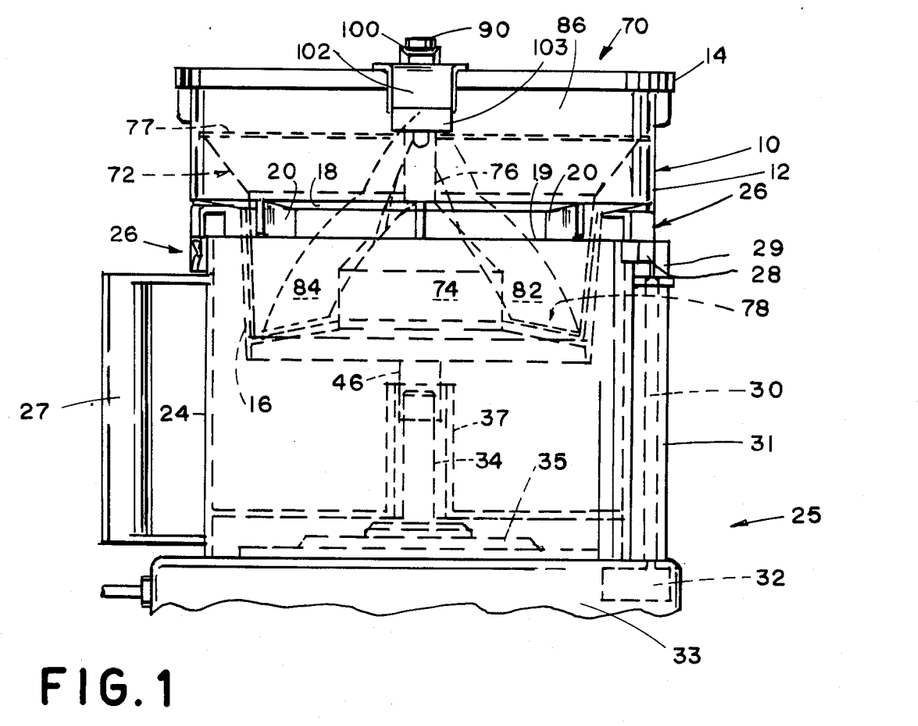
FIG. 1 is a side elevational view of a pureer/strainer attachment mounted on a food processor.

The underside of the shelf 18 also has secured thereto a pair of actuator units 26 diametrically positioned on the underside of the shelf 18 on opposite sides of the adapter unit 10 under the channel member 12. Each of the actuator units 26 has a sloping cam surface 28 thereon which is adapted to enter a slotted cap 29 protecting a conventional depressible vertical actuator rod 30 located in a boss 31 extending vertically on the bowl 24 (FIG. 1). Depression of this actuator rod 30 by the cam 28 activates an interlock switch 32 (FIG. 1) in the base housing 33 of the food processor 25 for enabling the motor drive 35 located in the base 33 to be operated. The actuator units 26 are secured under the shelf 18 in slightly different radial positions and having slightly different sizes in accordance with the size of the bowl of the model of food processor with which the adapter support unit 10 is intended to be employed. The purpose of thus locating these actuator units 26 is to position the respective cam surface 28 so that it will enter the slotted cap 29 and depress the actuator rod 30 on the particular size of bowl with which is employed the adapter 10. Accordingly, the ribs 20 with their assorted mounting steps 21, 22, 23 and the proper positioning of a pair of actuator units 26 on the underside of the shelf 18 provide the adapter support 10 with the flexibility to permit attachments, such as those which will be described hereinafter, to be applied to different sizes of bowls in the various models of food processors. There are two of the actuator units 26 for convenience of the user, because the adapter support 10 can thereby by mounted properly on the rim 19 of the bowl 24 in either of two alternative positions, and these actuating units 26 fasten the adapter unit 10 onto the rim of the bowl in a twist-lock manner.

The lower channel member 16 is terminated in a spider structure 36 (Please see FIG. 6) having an upper hub 38 with a socket 40 extending downwardly therefrom and with a central opening 42 extending through the bottom 41 of this socket 40. There are a plurality of vertically extending positioning slots 44 extending through the hub 38 and downwardly partially the height of the socket 40. These positioning slots 44 are employed to position and to prevent rotation of a transmission unit which will be described hereinafter. The spider configuration 36 of the structure which supports the hub 38 and socket 40 permits food processed by an attachment utilizing the adapter support 10 to pass down through the spider 36 and into the bowl 24.

Figure 3:
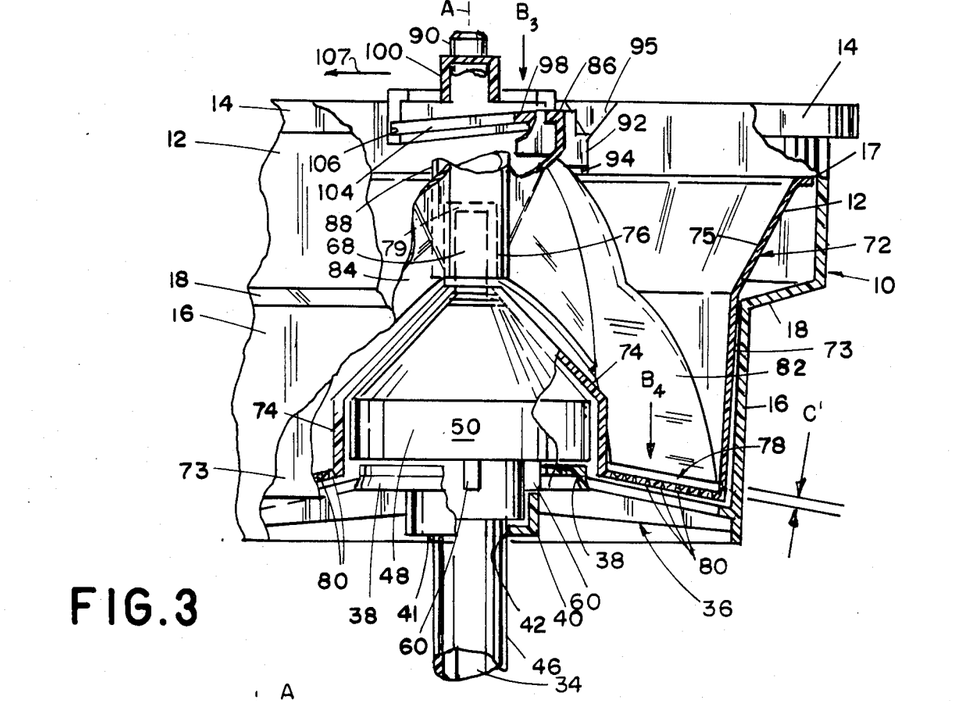
FIG. 3 is an enlarged partial sectional and elevational view, with certain parts broken away, illustrating the pureer/strainer of FIG. 1 mounted on the power output shaft of a speed-reduction, torque-increasing geared transmission unit seated in a spider of a bowl-extender adapter and illustrating the wiper blades in an elevated, larger clearance (or coarse) position within the hopper/strainer of the pureer/strainer attachment.
Figure 4:
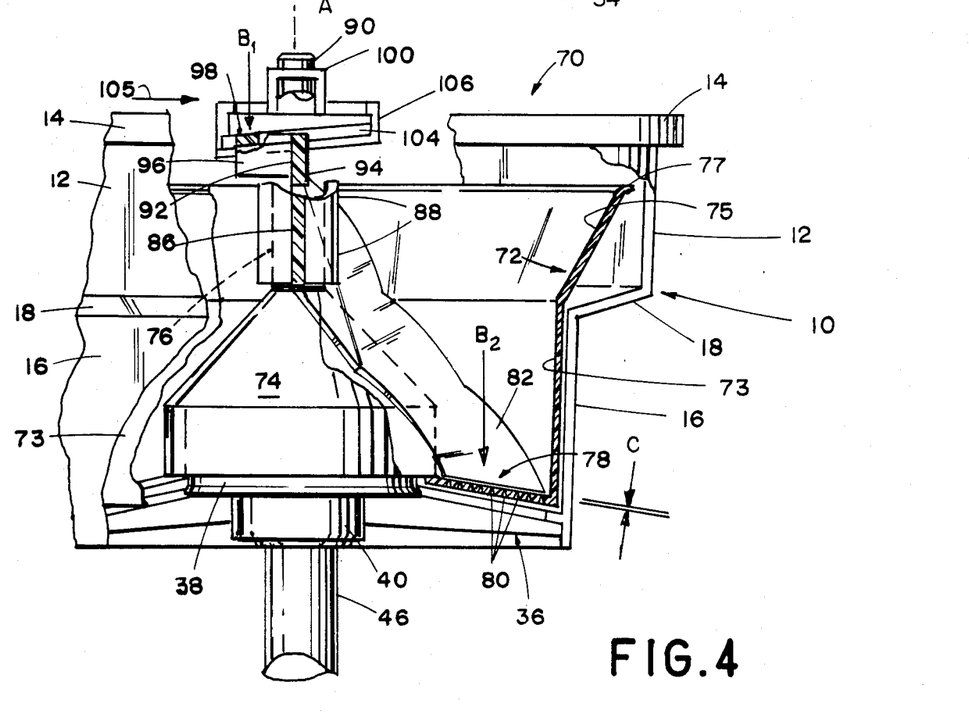
FIG. 4 is a view similar to FIG. 3, with different parts broken away, for illustrating the pureer/strainer attachment with the wiper blades shown in a lower (down) position in the hopper/strainer providing a smaller clearance (or fine) position for the pureer/strainer.
Figure 10:
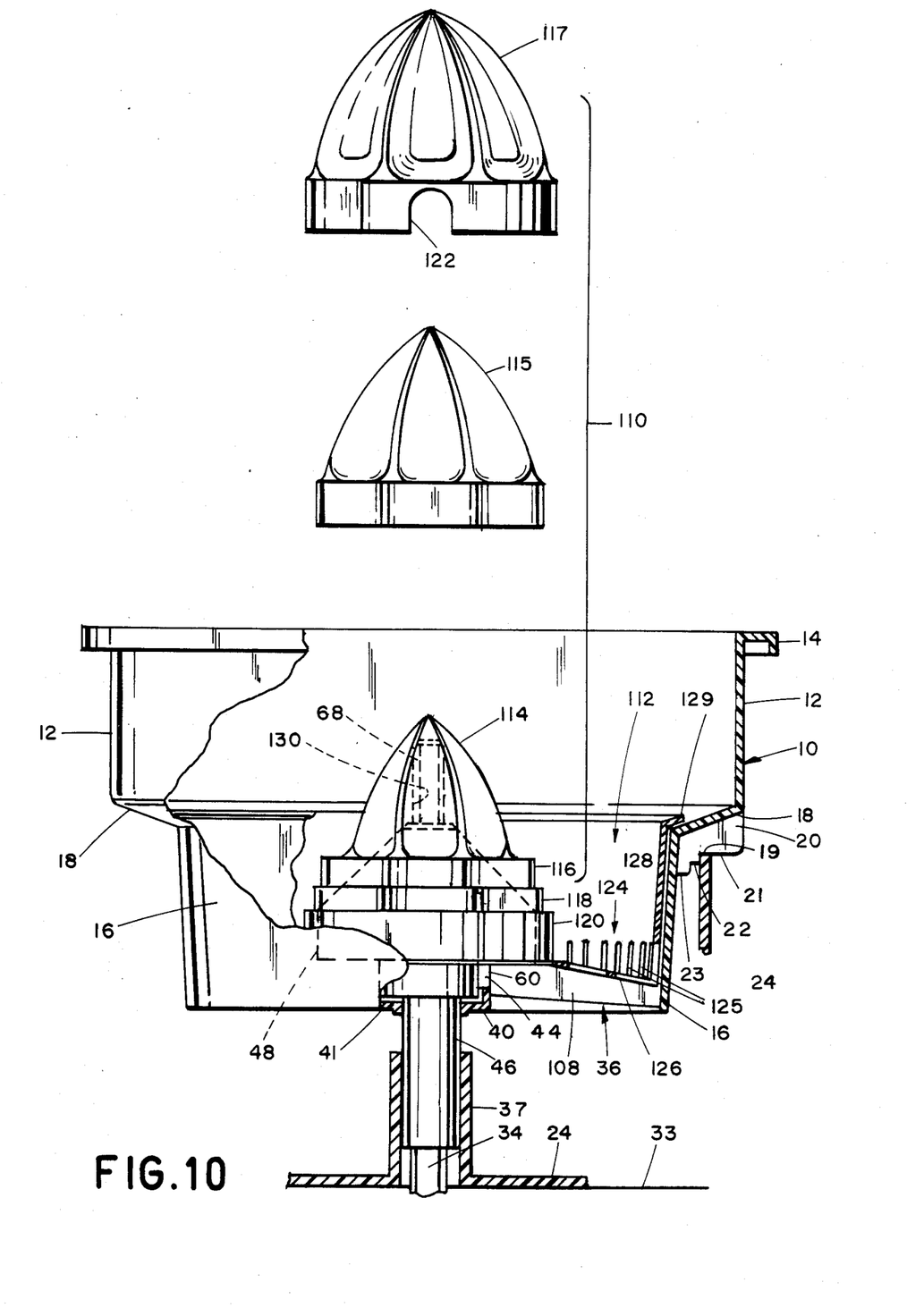
FIG. 10 is an exploded, partial elevational view of a juicer attachment mounted in the bowl extender actuator and adapter support unit, which juicer has three differently sized reamers, which mount together in telescoping relationship.

As seen in FIGS. 3, 4 and 10, the enlarged upper annular channel members 12 of the adapter unit 10 advantageously serves as an enlarged hopper for the various attachments uitlized therein, as will be described further below.

Speed-Reduction, Torque-increasing Geared Transmission Unit

Most food processors are characterized by having induction motor drives that turn a rotary tool drive shaft at speeds of about 1720 to about 1740 RPM (namely about 29 revolutions per second) which may be too fast or unsuitable for certain food processing operations for example, pureeing, straining, juicing, etc. For such food processing operations, a speed-reducing, torque-increasing geared transmission unit, referred to generally by the reference numeral 50 is provided. Although various types of speed-reduction transmissions can be arranged, reference is made now to FIG. 13 which illustrates a suitable, successful form of transmission which can be utilized to advantage in the embodiments of the present invention for markedly reducing the normal tool drive speed from about 1720–1740 RPM (about 29 revolutions per second) to less than one-fourth this normal speed, for example to about 180–300 RPM (about 3 to 5 revolutions per second.

Figure 13:
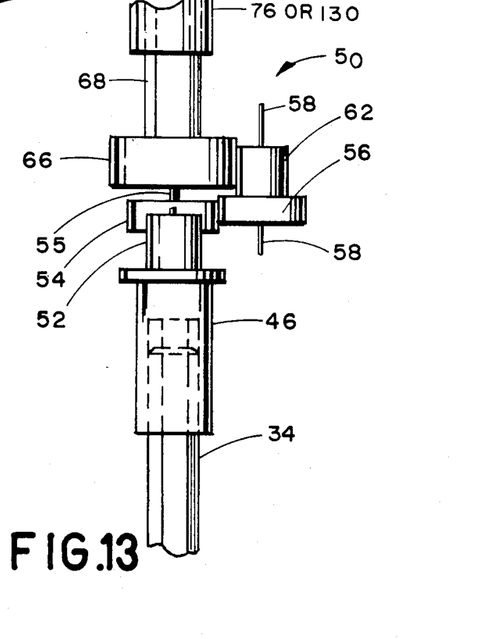
FIG. 13 is a diagrammatic view of the speed-reduction, torque-increasing geared transmission unit for purposes of explanation.

The present invention is not in the particular type of transmission unit 50, and various geared transmissions can be utilized, depending on the particular application speed desired. The present preferred transmission unit 50, as illustrated in FIG. 13, has a socket 46 which fits onto the rotary tool drive shaft 34 of the food processor 25 (FIG. 1) in positive mechanical non-slip engagement. The socket 46 carries a spur gear 52 which drives a gear 54 on a shaft 55, and this gear 54 in turn drives a gear 56 rotatably mounted on a shaft 58. The gear 56 is directly connected to a gear 62 mounted on the same shaft 58, and this latter gear 62 drives gear 66 which is secured on the power output shaft 68 of the transmission unit 50 which has a casing 48 (FIG. 3). As was pointed out, the number and size of the gears can be varied depending on the amount of reduction and the output speed desired.

For example, in order to achieve a speed reduction as described, the respective gears can have the numbers of teeth as follows:

| Gear: | No. of Teeth: |
|---|---|
| 52 | 8 |
| 54 | 22 |
| 56 | 22 |
| 62 | 10 |
| 66 | 25 |

This arrangement gives a speed reduction from 1740 RPM to 253 RPM.

In another example, the first three gears have the same numbers of teeth as above, but gears 62 and 66 have nine and twenty-four teeth, respectively, thus giving a reduction from 1740 RPM to 237 RPM.

In a third similar example, the first three gears have the same numbers of teeth as above, but gears 62 and 66 have nine and twenty-five teeth respectively, thus giving a reduction from 1740 RPM to 228 RPM.

In a fourth similar example, gears 62 and 66 have eight and twenty-four teeth, respectively, thus giving a reduction from 1740 RPM to 211 RPM.

In each example, the power output shaft 68 rotates in the opposite direction (clockwise as seen from above) from the input socket 46 (counterclockwise as seen from above). Thus, when a load is imposed upon the output shaft 68, the mechanical reaction of the casing 48 is in the counterclockwise direction which advantageously serves to keep the actuator 26 (FIG. 5) fully engaged in the slotted cap 29 (FIG. 1).

FIGS. 3 and 10 show the transmission casing 48 positioned in the socket 40 of the spider structure 36 of the adapter support unit 10. The driven socket 46 is shown coupled to the rotary tool drive shaft 34. The transmission casing 48 is provided with a pair of lugs 60 which house and provide bearings for the shafts 55 and 58, and these lugs serve to position the gear casing 48 in the positioning slots 44 in the socket 40 of the spider structure 36. The gear casing 48 is thus positioned and held stationary in the socket 40 with the driven socket 46 and the power output shaft 68 free to rotate.

As seen most clearly in FIG. 3, the casing 48 of the transmission unit 50 has a conical upper portion which tapers downwardly and outwardly to a cylindrical mid portion. Below this cylindrical mid portion of the casing 48 is a lower cylindrical portion of smaller diameter. It is this lower portion of the casing 48 which seats into the socket 40 and which has the positioning lugs 60 protruding therefrom. The difference in diameters of the cylindrical mid and lower portions of the casing 48 forms an annular shoulder which rests down on the annular hub 38 of the spider structure 36.

Pureer/Strainer Attachment

Figure 2:
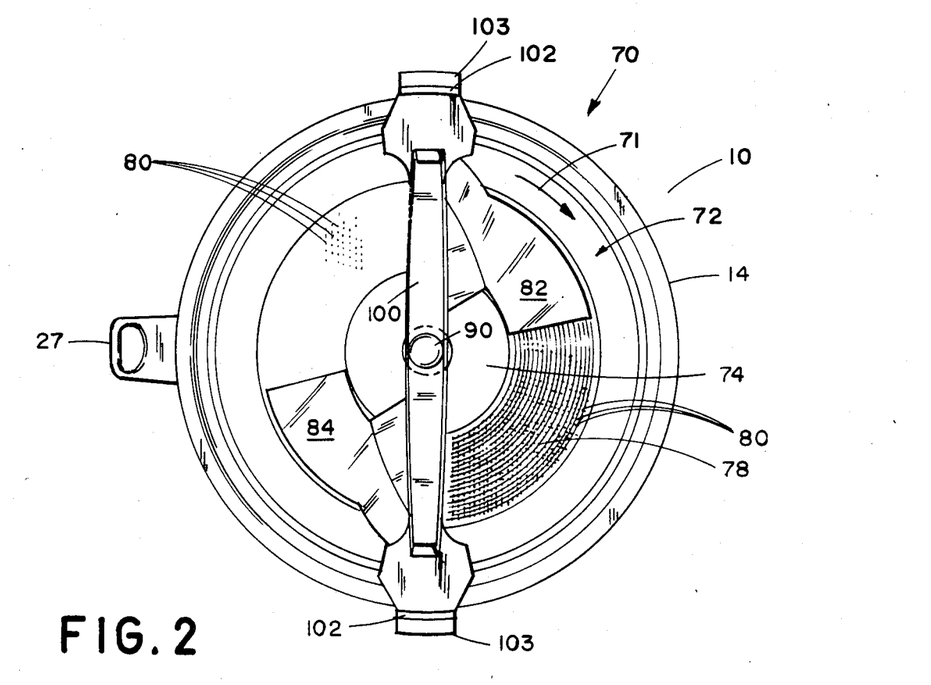
FIG. 2 is a top view of FIG. 1.

A pureer/strainer attachment, referred to generally by the reference numeral 70, is as shown in FIGS. 1 and 2 comprises a rotating strainer basket or hopper 72 having a centrally located hollow, conical dome 74 extending upwardly from the bottom of this basket 72 and terminating in a hexagonal drive socket 76 which is adapted to receive the hexagonal power output drive shaft 68 of the transmission unit 50 thereby coupling the basket 72 to the transmission unit 50 for rotating the basket within the adapter support 10. (Please see also FIG. 3). The rotating strainer basket 72 has an annular moat bottom region 78 with a plurality of small diameter holes 80 therethrough having a downwardly-enlarging draft, which draft in the openings 80 provides for easier passage of the foodstuff being processed by the pureer/strainer attachment 70. Since the drive socket 76 has a mating hexagonal configuration which matches the hexagonal configuration of the power output drive shaft 68 of the transmission unit 50, accordingly, the basket or hopper 72 is rotated within the adapter support unit 10 at the reduced speed (about 4 revolutions per second) of the output shaft 68 of the transmission drive unit 50 in the clockwise direction 71 (FIG. 2).

It is seen in FIGS. 3 and 4 that the rotating strainer basket 72 has a side wall 73 which is received within the lower annular channel member 16 of the adapter unit 10 (FIGS. 5 and 6) in freely rotatable relationship therein.

The upper portion 75 of this side wall 73 flares outwardly and upwardly above the shelf 18 and is received within the upper channel member 12 in freely rotatable relationship therein with the rim 77 of the rotating basket 72 located near the inner surface of the upper channel member 12 in a neat small-clearance relationship, as seen clearly in FIGS. 3 and 4.

Figure 7:
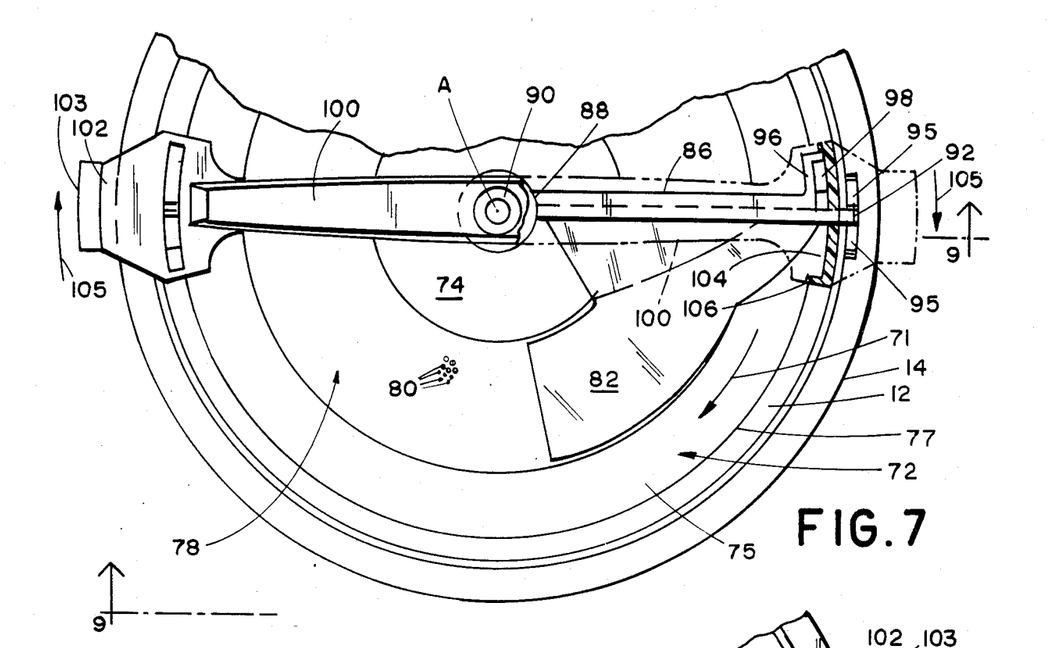
FIG. 7 is a partial top view shown partially in section of the pureer/strainer attachment mounted in the bowl extender actuator and adapter support unit for illustrating the bridge which holds the wiper blades in a down position i.e., the same position as in FIG. 4, for providing a fine position for the pureer/strainer attachment.
Figure 8:
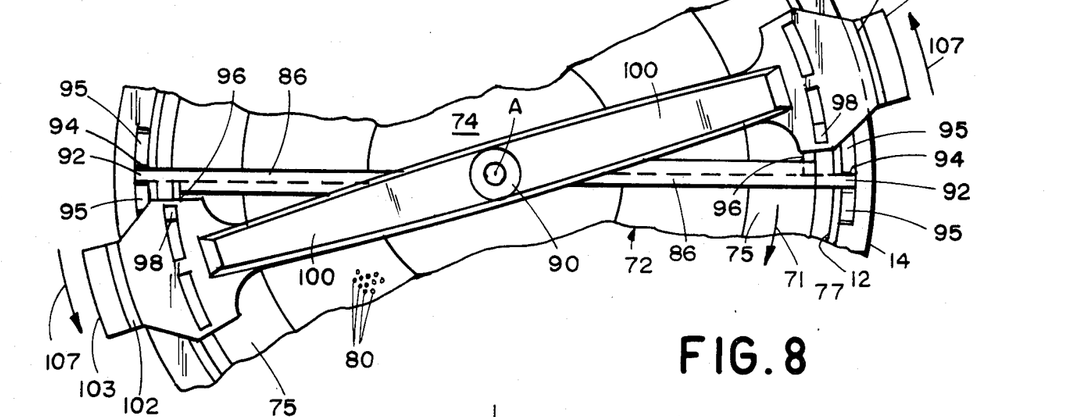
FIG. 8 is a partial top view similar to FIG. 7 illustrating the bridge being rotated slightly for elevating the wiper blades to produce a coarse adjustment for the pureer/strainer attachment, i.e., the same position as occurred in FIG. 3. For clarity of illustration the wiper blades are omitted from FIG. 8.

The central hollow conical dome 74 has an interior space which conforms relatively closely with the conical upper portion of the transmission casing 48 and also with the cylindrical mid portion of this casing 48 with just sufficient clearance for allowing the strainer basket 72 to revolve freely (arrow 71 in FIGS. 2, 7 and 8) around this gear casing 48. In other words, a near space-saving assembly is achieved between strainer basket 72 and the speed-reducing transmission unit 50 encircled by the annular moat region 78 of this revolving strainer basket 72. The arrow 71 in FIGS. 2, 7 and 8 shows the clockwise direction of rotation of the strainer basket 72 as seen from above.

In order to provide the pureer/strainer function in which the food items to be processed are forced down through the small diameter draft openings 80, for example of less than one-sixteenth of an inch in diameter, a pair of stationery adjustable wiper blades 82 and 84 are provided having a width slightly less than that of the annular moat 78 in the basket 80 in which they are suspended. The wiper blades 82 and 84 extend downwardly from an adjustable blade support 86 with the wiper blades being downwardly rearwardly inclined relative to the direction 71 of the revolving motion of the rotating basket 72. These inclined wiper blades 82 and 84 conform in overall shape relatively closely with the shape of the inner surfaces of the rotating strainer basket 72, as shown in FIGS. 3, 4 and 7. The adjustable blade support 86, as will best be seen in FIGS. 7, 8 and 9, extends symmetrically radially out on opposite sides from a central sleeve 88 having a hollow post 90 extending upwardly from the top of the sleeve 88. The adjustable blade support 86 is terminated at its outer ends in projections 92 which are adapted to fit into vertical grooves 94 having V-shaped throats 95 (See also FIGS. 3 and 7) in the inner wall of the upper channel member 12 of the adapter support 10. These radial projections 92 are in the same vertical plane as the blade support 86, and by engaging in the grooves 94 these projections 92 prevent the blades 82 and 84 and their support 86 from revolving while allowing the blade support 86 to be adjusted vertically in position. As will be seen in FIG. 8, the vertical grooves 94 are diametrically positioned in opposite side of the upper channel member 12 of the adapter support 10. Each end of the adjustable blade support 86 also carries a short curved tab 96 which is oriented generally perpendicular to the vertical plane of the adjustable blade support 86. These curved tabs 96 have horizontal projections 98 extending outwardly thereon. The curved tabs 96 with their horizontal projections 98 eminate from the opposite sides of the adjustable blade support 86 from the locations of the respective wiper blades 82 and 84, as seen in FIGS. 4 and 7 with respect to blade 82.

Figure 9:
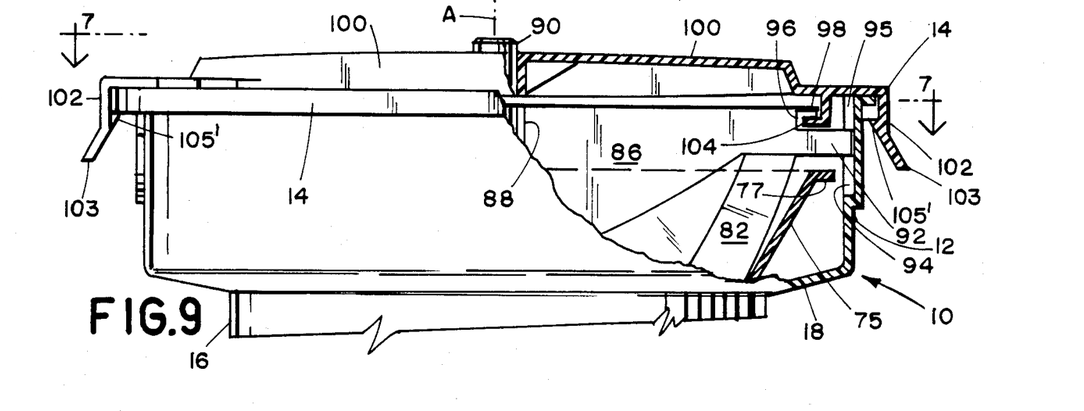
FIG. 9 is an elevational sectional view taken along line 9—9 of FIG. 7, illustrating the bridge mounted by spring clips on the rim of the bowl extender actuator and adapter support unit as seen in FIGS. 7 and 8.

In order to make the blade support 86 vertically adjustable, this blade support 86 is operatively associated with a bridge support bar 100 (See FIGS. 7, 8 and 9) which has a limited angular adjustment movement about the axis A of post 90. The bridge support bar 100 is terminated on the ends thereof in resiliently deflectable spring mounting clips 102 which are adapted to attach the bridge bar 100 onto the rim 14 of the adapter support 10. There are downwardly and outwardly sloping lift tabs 103 on each spring clip 102. The spring clips 102 have detents 105 which engage beneath the rim 14 in a snap-on manner. Spaced radially inwardly from the spring clips 102 on the support bar 100 are short annular channel ramps 104 having stops 106 at both ends of each ramp. Into these annular channel ramps 104 extend the horizontal projections 98 which project outwardly from the curved tabs 96 located on opposite ends of the adjustable blade support 86. Accordingly, as the bridge 100 is manually adjusted by turning it around the center post 90, as seen by comparing the position of the bridge 100 in FIGS. 7 and 8, the annular ramps 104 are adjusted in a circumferential direction, causing the horizontal projections 98 to be slid up or down these annular channel ramps, thereby adjusting the blade support 86 up or down. The bridge support bar 100 is manually turned about the axis A of the center post 90 by sliding its spring clips 102 in a circumferential direction along the rim 14 of the adapter support unit 10, as shown by the curved arrows 105 and 107 in FIGS. 7 and 8, respectively.

When the bridge support 100 is manually adjusted by sliding its mounting clips 102 along the rim 14 in the direction 105 (FIGS. 4 and 7) thus moving the bridge 100 toward parallelism with the blade support 86, the channel ramps 104 cause the horizontal projections or tabs 98 to be adjusted downwardly, as pointed out by the arrow $B_1$ in FIG. 4, and consequently cause the wiper blades 82 and 84 to be adjusted downwardly as shown at $B_2$ in FIG. 4. Thus, the clearance C (FIG. 4) between the lower edges of the wiper blades and the strainer openings 80 is reduced to a very small clearance (or even to zero clearance, if desired).

Conversely, when the bridge support 100 is manually adjusted by sliding its mounting clips 102 along the rim 14 in the direction 107 (FIGS. 8 and 3) thus moving the bridge 100 away from parallelism with the blade support 86, the channel ramps 104 cause the horizontal projections or tabs 98 to be adjusted upwardly, as pointed out by the arrow $B_3$ in FIG. 3. Thereby, the wiper blades 82 and 84 are adjusted upwardly as pointed out at $B_4$ in FIG. 3. As a result, the clearance C' (FIG. 3) between the lower edges of the wiper blades and the strainer openings 80 is increased to a significant clearance, for example about 3/32 to ⅛ of an inch.

It is to be noted that the spring clips 102 grip the rim 14 with sufficient frictional grip for causing the bridge 100 to retain its adjusted position. Moreover, the bridge 100 can be adjusted into any intervening position between its two extreme positions as limited by the stops 106 (FIG. 4). Thus, in this illustrative embodiment the clearance C can be adjusted to any desired value between zero and about ⅛ of an inch.

In summary, FIGS. 3 and 8 illustrate the adjustable blade support 86 holding the wiper blades 82 and 84 in an up position "$B_4$" as illustrated in FIG. 3 when the horizontal projections 98 are in up position "$B_3$" in the ramp 104. To provide such an assembly as illustrated in FIG. 3, the gear transmission 50 (FIG. 13) enclosed in the gear casing 48 has its drive socket 46 positioned on the rotary tool drive shaft 34 of the food processor, and the rotating strainer basket 72 has its drive socket 76 mounted on the power output shaft 68 of the transmission 50. The sleeve 88 of the adjustable blade support 86 has been mounted encircling the outside of the socket 76 extending up from the conical dome 74 of the rotating strainer basket 72 with the projections 92 having been slid down into the vertical grooves 94 in the annular channel member 12 of the adapter support unit 10. The bridge 100 has been clipped onto the rim 14 of the adapter support unit 10, and has been adjusted about the post 90 along the rim 14 as shown by the arrows 107 in FIG. 8, which in effect runs the horizontal projections 98 up the annular channel ramps 104 to the position "$B_3$" shown in FIG. 3 in which the adjustable blade support, and accordingly its wiper blades 82 and 84 are lifted up from the perforated bottom 78 of the rotating basket 72 approximately ⅛th of an inch, as is indicated in FIG. 3 by the clearance separation arrows C'. This up position of the wiper blades 82 and 84 provides a coarse straining adjustment, which is used for those food items which are more desirably processed if the blades do not wipe along the perforated bottom 78 of the strainer basket 72.

In summary when the bridge 100 has been turned about the post 90 in a clockwise direction 105 (FIG. 7) to the position shown in FIGS. 7 and 4, the horizontal projections 98 of the adjustable blade support 86 and its wiper blades 82 and 84 become lowered to the respective positions "$B_1$" and "$B_2$" shown in FIG. 4, where the separation between the perforated bottom 78 of the strainer basket 72 and the lower edge of the wiper blades is minimum so as to produce wiping contact as shown by minimum clearance "C" in FIG. 4. In this down position of the projection 98 on the annular channel ramps 104, the adjustable blade support 86 and its wiper blades 82, 84 provide a fine pureeing in which little or no space is provided at "C" between the bottom of these inclined blades 82, 84 and the small openings 80 in the bottom of the rotating strainer basket 72. The stops 106 in the channel ramps 104 limit the amount of angular adjustment 105, 107 permitted for the bridge 100.

The stationary sleeve 88 (FIGS. 3 and 4) at the middle of the blade support 86 encircles the upwardly extending socket portion 76 of the conical dome 74 of the rotating strainer/pureer basket 72, thereby stabilizing its rotation. This sleeve 88 can slide up or down slightly along the outside of this upstanding socket portion 76 for accommodating the blade adjustments $B_1$, $B_2$, $B_3$, $B_4$.

In order to scrape the strained or pureed foodstuffs away from the bottom of the small openings 80 in the revolving annular bottom 78 of the rotating strainer basket 72, the spider structure 36 (FIG. 6) of the adapter support unit 10 is advantageously utilized. This stationary spider structure 36 includes four radial struts 108 having sharp leading edges 109 and smooth upper surfaces. The revolving perforated annular moat-like bottom 78 of the rotating strainer basket 72 rests down upon the smooth upper surfaces of the radial struts. Thus, the leading edges 109 of these struts 108 serve to scrape the strained or pureed foodstuffs off from the small holes 80 so that the strained or pureed foodstuffs will fall into the bottom of the bowl 24 (FIG. 1). For allowing this scraping, the socket 76 has sufficient axial length to provide clearance at 79 (FIG. 3) above the upper end of the power output shaft 68, so that this socket 76 does not seat down upon the upper end of this power output shaft.

Juicer Attachment

Figure 11:
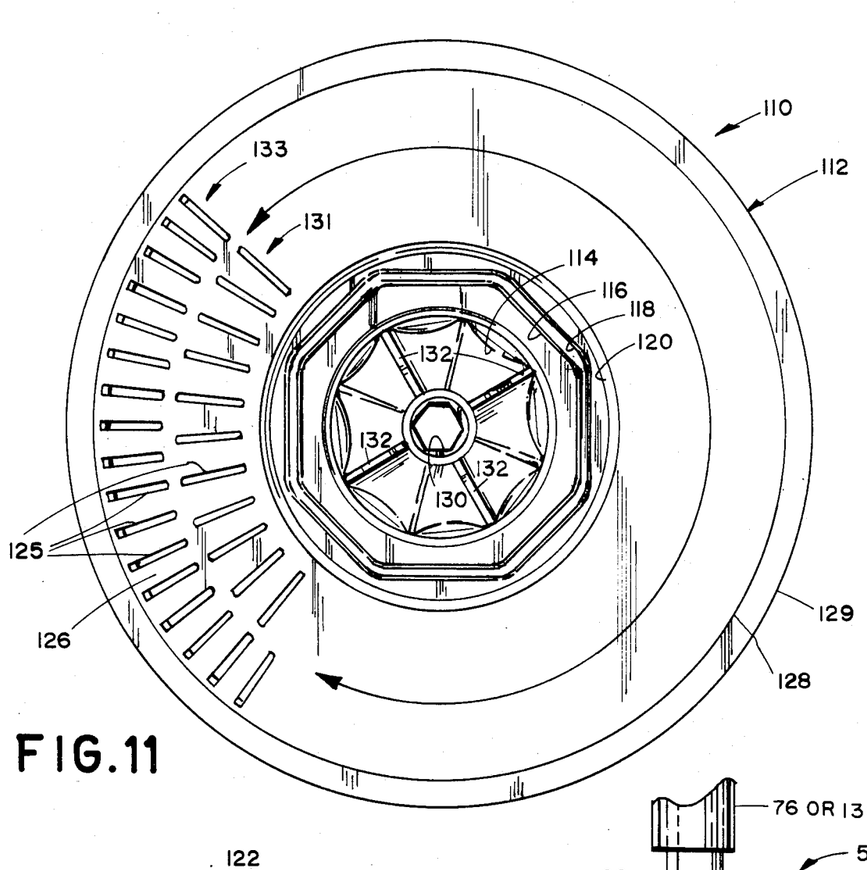
FIG. 11 is a bottom view of the juicer attachment illustrated in FIG. 10 and being shown in full size, which is somewhat larger than seen in FIG. 10.

The adapter support unit 10 and its associated speed-reducing transmission unit 50 can be used for operating other attachments such as the citrus juice attachment referred to generally by the reference numeral 110 in FIGS. 10 and 11, having a rotating basket 112 with an integral juicer-reamer 114 extending upwardly from a centrally located integral octagonal base 116 positioned on a larger integral octagonal base 118 which is positioned on a larger integral circular central pedestal base 120. The stepped configuration polygonal (octagonal) bases 118 and 116 provide a spline-like means for telescopicly receiving (and for holding for positive-drive engagement thereon) an intermediatesize juicer/reamer 115 which is adapted to frictionally fit over and have a complementary polygonal configuration to that of the base 116. A larger juicer/reamer 117 having finger-clearance U-shaped notches 122 in the skirt thereof is adapted to fit telescopicly over juice reamer 115 and onto octagonal base 118 to be held thereon in positive drive by the polygon configuration of the base 118. The stepped, spline base 116, 118 is therefore capable of receiving and holding the medium-size reamer 115 and larger reamer 117.

Figure 12:
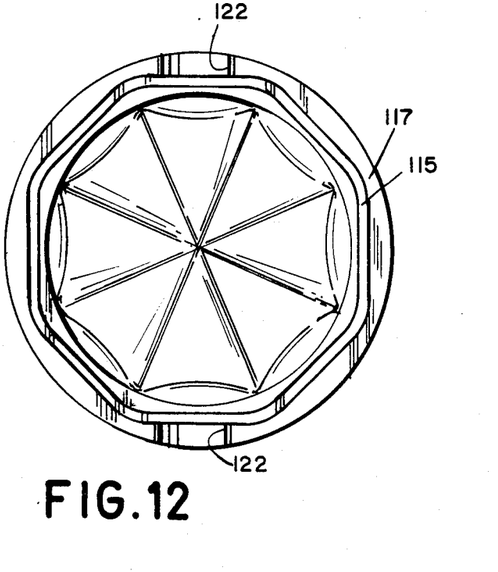
FIG. 12 is a bottom view of the largest juice reamer seen in FIG. 10 telescoped in nested relationship onto the intermediate juice reamer seen in FIG. 10 for showing their nested relationship.

The smaller, intermediate, and larger reamers 114, 115 and 117, may be considered to be a "lemon", "orange", "grapefruit" reamer, respectively. The clearance notches 122 in the skirt of the grapefruit reamer 117, as shown in the bottom view FIG. 12, enable the user to grasp the skirt of the orange reamer 115 for removing the snug-fitting orange reamer 115 out from within the hollow interior of the grapefruit reamer 117.

It is to be noted that the hollow lemon juice reamer 114 and the stepped polygons 116, 118 on top of the circular cylindrical pedestal 120 and the slotted bottom 126 (Please see also FIG. 11) and the side wall 128 and the rim 129 of the juicer basket 112 are all one integrally-molded unit formed of rigid, inert plastic material.

An annular channel or moat 124 is formed between the side wall 128 and the central pedestal 120 of the rotating juicer basket. The annular bottom 126 having a plurality of radially elongated apertures 125 extending therethrough permits juice to fall into the bowl 24 of the food processor through the spider structure 36 of the adapter support unit 10. These radially elongated apertures 125 extend in two concentric circular rows 131, 133 (FIG. 11) in the annular bottom wall 126 of the rotatable juicer basket 112. The slot-like apertures 125 in the outer row 133 extend approximately one-half inch upwardly (Please see FIG. 10) in the side wall 128 of the juicer basket 112.

FIG. 11 shows the bottom view of the basket 112 illustrating the socket 130 which is formed in the hollow domed integral lemon reamer 114 being supported therein by quadrature ribs 132. This hexagonal socket 130 fits onto the power output shaft 68 of the transmission unit 50. The depth of this socket 130 is intentionally made so that the top of this socket seats directly upon the upper end of the power output shaft 68 for bearing the downward thrusts imposed by a user when reaming citrus fruits on any of the juice reamers 114, 115, 117. FIG. 11 also clearly shows the slotted apertures 125 arranged in a concentric two-circular-row configuration 131, 133 around the bottom 126 of the juicer basket 112 with the outer apertures extending slightly up into the side wall 128 of the juicer basket 112.

In operation as seen in FIG. 10, the transmission 50 (FIG. 13) has its socket 46 coupled onto the rotary tool drive shaft 34 extending up through the well 37 in the bottom of the bowl 24 of the food processor. The rotatable integral basket 112 of the juicer attachment 110 has its socket 130 mounted onto the power output shaft 68 of the gear transmission unit 50, whereby the reamer 114 together with the basket 112 are free to rotate within the annular channel member 16 of the adapter support unit 10. As is clearly seen in FIG. 10, the positioning lug 60 of the casing 48 of the gear transmission unit 50 is seated in a slot 44 of the well 40 in the spider structure 36 which maintains the transmission fixed in position stationary while the reamer 114 and the basket 112 are being rotated by the power output shaft 68 at a reduced speed of about 4 revolutions per second which is much less than the normal tool drive speed of about 29 revolutions per second for the food processor 25 (FIG. 1). The smaller reamer 114 may be utilized for juicing lemons or other smaller citrus fruits. If it is desired to juice larger citrus fruits, such as oranges, the intermediate cap-like reamer 115 can be telescoped over the reamer 114 to be held thereon by the stepped splined base 116 for processing such larger citrus fruits. If still larger fruits, such as grapefruits, are desired to be juiced, the largest cap-like reamer 117 can be placed over the intermediate reamer 115 to be held by the stepped splined base 118 for juicing larger citrus fruits. The largest reamer 117 can also be mounted directly upon the octagonal base section 118 without having the medium reamer 115 mounted upon its octagonal base section 116.

The bowl extender and adapter support unit 10 adapts to various sizes of bowls 24 to enable utilizing the same attachments to the various sizes of bowls, such as the juicer and pureer/strainer attachments 110 and 70, which have been disclosed herein. The rim 129 (FIG. 10) of this juicer basket neatly conforms with slight clearance of less than 3/16 of an inch to the shape of the juncture of the annular lower member 16 and the intermediate shelf 18 of the adapter support unit 10. Thus, the enlarged upper annular channel member 12 is serving as a hopper-extender for the rotating juicer basket 112. In the strainer/pureer attachment 70, the wiper blades 82, 84 are conveniently adjustable in clearance "C" to "C'", thereby, advantageously increasing the versatility for performing the pureer/strainer function. The juicer attachment is characterized by having a basket which rotates as an integral unit together with its reamer which tends to agitate and move the juice and pulp around in the annular moat 124 of the juicer basket 112 for depositing larger relative amounts of the desired juice in the bowl which might be otherwise retained in the juicer basket with pulp. It is noted, as seen in FIG. 10, that the annular apertured bottom 126 of the rotating juicer basket 112 slopes downwardly and outwardly. Thus, the juicy pulp advantageously is urged to slide outwardly away from the central pedestal 114-116-118-120 so that this juicy pulp is advantageously impelled by the centrifugal action and agitation of the revolving side wall 128 for releasing additional juice which issues through the outermost row 133 (FIG. 11) of slot-like apertures 125. By virtue of the fact that these apertures 125 extend about one-half inch up into the side wall 128, the agitation and centrifugal action at about 4 revolutions per second is enhanced. In addition, a plurality of reamers of various sizes can be utilized conveniently, easily mounted on the pedestal in the basket for rotation without employing separate baskets, thereby making it more efficient and easier to juice different sizes of citrus fruits.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and reasonable equivalents of the claimed elements.

What is claimed is:

1. Food processing apparatus for use in a food processor, said food processor having a motor drive with interlock means for enabling and disabling the operation of said motor drive, a working bowl and a rotary tool drive which is accessible in said bowl and is driven by said motor drive and is adapted to have rotary tools coupled thereto for rotation at a normal speed to perform food processing operations, said food processing apparatus comprising:

a bowl-extender-actuator-and-adapter support unit having an enlarged upper annular channel member and a smaller lower annular channel member with an intermediate shelf joining said lower annular channel member to said upper annular channel member, said adapter support unit being adapted to be manually fastened in a predetermined fixed position on said bowl, with said lower annular channel member extending down into said bowl, said lower annular channel member being terminated at its lower end in a spider structure having a central socket with a central opening therethrough in alignment with said tool drive when said adapter support unit is fastened on said bowl in said predetermined fixed position, actuator means on said adapter support unit extending outside of said bowl into activating relationship with said interlock means when said adapter support unit is fastened on said bowl in said predetermined fixed position for activating said interlock means for enabling said motor drive to be operated, said enlarged upper annular channel member of said adapter support unit extending upwardly above said bowl in the nature of an enlarged hopper when said adapter support unit is fastened in said predetermined fixed position on said bowl, a speed-reducing, torque-increasing transmission unit removably mountable in said socket of said spider structure, said transmission unit having first rotatable coupling means on its lower end adapted to be coupled with said rotary tool drive in power input driven relationship therewith, for turning said normal rotational speed of the rotary tool drive of the food processor, said transmission unit having second rotatable coupling means on its upper end geared to said first coupling means for turning at a markedly reduced rotational speed less than one-fourth said normal speed for providing power output at said reduced speed, said transmission unit having a casing with positioning means thereon engageable with said socket for preventing rotation of said transmission casing with respect to said adapter support unit, a food processor juicer attachment rotatably mountable within said adapter support unit and having third coupling means adapted to be coupled with said second coupling means for driving said attachment of said markedly reduced speed less than one-fourth of said normal speed, said food processor juicer attachment comprising a juicer basket rotatable in said adapter support unit, said juicer basket having a bottom with a plurality of openings in said bottom for allowing juice to pass down through said openings and through said spider structure to be collected in said food processor bowl, a central pedestal in said basket integral with the bottom thereof, a first juice reamer on said pedestal integral with said pedestal, said juicer basket and said central pedestal and said first juice reamer being molded as an integral unit, said third coupling means being located concentrically within said first juice reamer and seating upon said second coupling means for causing the downward thrusts imposed by manually held citrus fruit upon said first juice reamer to be borne by said transmission unit, and said juicer basket having an outwardly flaring rim which conforms closely with said shelf of said adapter support unit near the juncture of said shelf with said lower annular channel member.

2. Food processing apparatus as claimed in claim 1, wherein:

said pedestal includes at least one spline-like region on said pedestal near the bottom of said first juice reamer for enabling a second hollow juice reamer larger than said first juice reamer and having a spline-like skirt to be telescopically mounted around said first juice reamer with said spline-like skirt engaging said spline-like region on said pedestal in positive drive relationship therewith for use in juicing larger citrus fruits than accomodated by said first juice reamer.

3. Food processing apparatus as claimed in claim 2, wherein:

said spline-like region on said pedestal near the bottom of said first juice reamer is a stepped octagonal configuration for enabling said second hollow juice reamer having an octagonal skirt to be telescopically mounted around said first juice reamer with said octagonal skirt engaging said stepped octagonal configuration in positive drive relationship, and for enabling a third hollow juice reamer larger than said second juice reamer and having an octagonal skirt to be telescopically mounted around said first juice reamer with the octagonal skirt of said third juice reamer engaging said stepped octagonal configuration in positive drive relationship and for enabling said third juice reamer to be telescopically mounted around said second juice reamer which in turn is telescopically mounted around said first juice reamer and with said third juice reamer being engaged in positive drive relationship.

4. Food processing apparatus as claimed in claim 1, in which:

said bottom of said juicer basket encircles aid pedestal in an annular moat-like configuration, said juicer basket has a side wall extending up from said bottom and terminating in said outwardly flaring rim, said side wall is generally parallel with and spaced inwardly from said lower annular channel member of said adapter support unit, said bottom slopes downwardly radially outwardly from said pedestal to said side wall, and said openings include a plurality of radially elongated slots extending radially in said bottom and extending upwardly in said side wall near said bottom for said slots to augment the agitation and centrifugal action of the revolving bottom and side wall of the juicer basket in releasing juice from citrus pulp moving in said moat-like bottom of said juicer basket.

5. Food processing apparatus for use in a food processor, said food processor having a motor drive with interlock means for enabling and disabling the operation of said motor drive, a working bowl and a rotary tool drive which is accessible in said bowl and is driven by said motor drive and is adapted to have rotary tools coupled thereto for rotation at a normal speed to perform food processing operations, said food processing comprising:

a bowl-extender-actuator-and-adapter support unit having an enlarged upper annular channel member and a smaller lower annular channel member with an intermediate shelf joining said lower annual channel member to said upper annular channel member, said adapter support unit being adapted to be manually fastened in a predetermined fixed position on said bowl, with said lower annular channel member extending down into said bowl, said lower annular channel member being terminated at its lower end in a spider structure having a central socket with a central opening therethrough in alignment with said tool drive when said adapter support unit is fastened on said bowl in said predetermined fixed position, actuator means on said adapter support unit extending outside of said bowl into activating relationship with said interlock means when said adapter support unit is fastened on said bowl in said predetermined fixed position for activating said interlock means for enabling said motor drive to be operated, said enlarged upper annular channel member of said adapter support unit extending upwardly above said bowl in the nature of an enlarged hopper when said adapter support unit is fastened in said predetermined fixed position on said bowl, a speed-reducing, torque-increasing transmission unit removably mountable in said socket of said spider structure, said transmission unit having first rotatable coupling means on its lower end adapted to be coupled with said rotary tool drive in power input driven relationship therewith, for turning at said normal rotational speed of said rotary tool drive of the food processor, said transmission unit having second rotatable coupling means on its upper end geared to said first coupling means for turning at a markedly reduced rotational speed less than one-fourth said normal speed for providing power output at said reduced speed, said transmission unit having a casing with positioning means thereon accessible with said socket for preventing rotation of said transmission casing with respect to said adapter support unit, a food processor strainer attachment rotatably mountable within said adapter support unit and having third rotatable coupling means adapted to be coupled with said second coupling means for driving said strainer attachment at said markedly rotational speed of less than one-fourth said normal speed, said food processor strainer attachment comprising a strainer basket rotatable in said adapter support unit, said strainer basket having a bottom with a multitude of small openings in said bottom for strained foods to pass down through said small openings, said spider structure including a plurality of struts extending from said lower annular channel member to said socket, said strainer basket having third coupling means centrally located in said strainer basket for engaging with said second coupling means of said transmission unit for rotating said strainer basket at said markedly reduced speed less than one-fourth said normal speed, said third coupling means providing sufficient axial clearance with respect to said second coupling means for causing the rotating bottom of said strainer basket to slide against said struts of the spider structure for scraping strained foods off from said bottom, a bridge removably mountable on said adapter support unit for scanning above the rotating strainer basket, a plurality of wiper blades carried by said bridge extending down into said strainer basket near said bottom, and manually adjustable means for elevating and lowering said wiper blades with respect to the rotating strainer basket for adjusting the clearance between said wiper blades and said bottom of the rotating strainer basket.

6. Food processing apparatus as claimed in claim 5, in which:

said wiper blades are mounted on a blade support, and said manually adjustable means elevate and lower said blade support with respect to said bridge.

7. Food processing apparatus as claimed in claim 5, in which:

said upper annular channel member terminates at its top in a rim, and said bridge has mounting means on each end removably mountable on said rim of the upper annular channel member.

8. Food processing apparatus as claimed in claim 6, in which:

said upper annular channel member terminates at its top in a rim, and said bridge has mounting means on each end removably mountable on said rim of the upper annular channel member.

9. Food processing apparatus as claimed in claim 8, in which:

said bridge is pivotally connected to said blade support by pivot means at the center of said blade support for enabling said bridge to be turned about a central vertical axis with respect to said blade support, said mounting means on each end of said bridge allows said bridge to be turned relative to said rim, said pivot means allows said blade support to be elevated and lowered with respect to said bridge, said blade support extends across said upper annular channel member and said blade support and said upper annular channel member interengage each other for preventing rotation of said blade support while allowing said blade support to be elevated and lowered with respect to said upper annular channel member, and inclined ramp means coact between said bridge and said blade support for elevating and lowering said wiper blades with respect to said bottom of the strainer basket by turning said bridge relative to said rim for adjusting the clearance between said wiper blades and said bottom of said rotating strainer basket.

10. Food processing apparatus as claimed in claim 9, in which:

said upper annular channel member has a pair of vertical grooves located on opposite sides of said upper annular channel member, said pair of grooves face inwardly toward each other, said blade support includes a pair of projections located on opposite ends thereof engaging into said grooves for preventing rotation of said blade support while allowing said blade support to be elevated and lowered with respect to said upper annular channel member for adjusting the clearance between said wiper blades and said bottom of said rotating strainer basket.

11. Food processing apparatus as claimed in claim 5, wherein:

said bridge is terminated on each end in a spring clip, and each clip is adapted to be removably attached on the top of said upper channel member of said adapter support unit, a sloped ramp is located on said bridge adjacent to each of said spring clips, said spring clips permit said bridge to be manually turned into various positions with respect to said adapter support unit, said upper channel member of said adapter support unit has a pair of grooves therein, a blade support has said wiper blades extending downwardly therefrom, said blade support is pivotally mounted on said bridge, said blade support includes projections extending outwardly from said blade support and adapted to be mounted in said grooves for preventing said wiper blades from turning with respect to the bottom of said strainer basket by manually turning said bridge relative to said adapter support unit.

12. Food processing apparatus for use in a food processor having a motor drive with interlock means for enabling and disabling the operation of said motor drive, a working bowl and a rotary tool drive accessible in the bowls which is driven by said motor drive and is adapted to have various tools coupled thereto for rotation at the normal speed of said tool drive, said food processing apparatus comprising:

a bowl extender-actuator-and-adapter support unit having larger upper and smaller lower annular channel members joined by an intermediate shelf, said lower annular channel member extending down into said bowl and being terminated in a spider with a central opening therethrough, said adapter support unit having a plurality of mounting steps on said shelf for mounting said adapter support unit on various sizes of bowls of various models of food processors in a predetermined fixed position on each bowl with said central opening in said spider in alignment with said rotary tool drive, actuator means on said adapter support unit extending outside of said bowl into activating relationship with said interlock means when said adapter support unit is mounted on a bowl in said predetermined fixed position for activating said interlock means for enabling said motor drive to be operated, a speed-reducing, torque-increasing transmission unit removably mountable in said spider, said transmission unit having first rotatable coupling means on its lower end adapted to be coupled with said rotary tool drive for turning said first coupling means at said normal speed of said rotary tool drive, said transmission unit having second rotatable coupling means on its upper end geared to said first coupling means for turning at a markedly reduced rotational speed less than one-fourth said normal speed for providing power output at said reduced speed, said transmission unit having a casing with positioning means thereon engageable with said spider for preventing rotation of said transmission casing relative to said adapter support unit, a strainer basket rotatably mountable within said adapter support unit and having a third rotatable coupling means adapted to be coupled with said second coupling means for rotating said strainer basket in a predetermined direction at said markedly reduced rotational speed of less than one-fourth said normal speed, said strainer basket having a bottom with a multitude of small openings in said bottom for straining foodstuff down through said small openings, a plurality of wiper blades, blade support means removably mountable on said adapter support unit for mounting said wiper blades extending down into said strainer basket with said wiper blades inclined downwardly rearwardly with respect to said predetermined direction of rotation of said strainer basket for urging foodstuffs in said rotating strainer basket down through said small openings in said bottom, and manual adjustment means associated with said blade support means for adjusting the clearance between said stationary wiper blades and the bottom of said rotating strainer basket for adjusting the fineness with which the foodstuff is strained through said small openings.

13. Food processing apparatus as claimed in claim 12, in which:

said spider includes a plurality of struts, said third coupling means provides sufficient axial clearance with respect to said second coupling means of said transmission unit for allowing the bottom of said rotating strainer basket to slide against said struts of said spider for scraping off from said bottom strained foodstuff which has been strained through said small openings.

14. Food processing apparatus as claimed in claim 12, in which:

said blade support means includes a bridge spanning across the top of said upper annular channel member of said adapter support unit, said bridge has removable attachment means at each end of the bridge for removably attaching the ends of the bridge to the top of said upper annular channel member, and said manual adjustment means elevates and lowers said wiper blades with respect to said bridge.

15. Food processing apparatus as claimed in claim 13, in which:

said blade support means includes a bridge spanning across the top of said upper annular channel member of said adapter support unit, said bridge has removable attachment means at each end of the bridge for removably attaching the ends of the bridge to the top of said upper annular channel member, and said manual adjustment means elevates and lowers said wiper blades with respect to said bridge.

16. Food processing apparatus as claimed in claim 14, in which:

said bridge is pivotally connected to said wiper blades for permitting said bridge to be turned manually about a vertical axis into various angular positions with respect to said wiper blades, said wiper blades includes projections connected to said wiper blades and engaging with said upper annular channel member for preventing said wiper blades from turning with respect to said adapter support unit while permitting said wiper blades to be elevated and lowered with respect to said adapter support unit, said attachment means at each end of the bridge permits said bridge to be turned about said vertical axis into various angular positions with respect to said adapter support unit, and said manual adjustment means is operatively associated with said bridge and with said wiper blades and is responsive to the angular position of said bridge with respect to said wiper blades for elevating and lowering said wiper blades by turning said bridge with respect to said adapter support unit for adjusting the clearance between said wiper blades and the bottom of said rotating basket for adjusting the fineness with which the foodstuff is strained through said small openings.

17. Food processing apparatus as claimed in claim 15, in which:

said bridge is pivotally connected to said wiper blades for permitting said bridge to be turned manually about a vertical axis into various angular positions with respect to said wiper blades, said wiper blades includes projections connected to said wiper blades and engaging with said upper annular channel member for preventing said wiper blades from turning with respect to said adapter support unit while permitting said wiper blades to be elevated and lowered with respect to said adapter support unit, said attachment means at each end of the bridge permits said bridge to be turned about said vertical axis into various angular positions with respect to said adapter support unit, and said manual adjustment means is operatively associated with said bridge and with said wiper blades and is responsive to the angular position of said bridge with respect to said wiper blades for elevating and lowering said wiper blades by turning said bridge with respect to said adapter support unit for adjusting the clearance between said wiper blades and the bottom of said rotating basket for adjusting the fineness with which the foodstuff is strained through said small openings.

* * * * *